United States Patent [19]
Geuy et al.

[11] Patent Number: 5,123,442
[45] Date of Patent: Jun. 23, 1992

[54] REGULATING SHUT OFF VALVE

[75] Inventors: Timothy R. Geuy, Anaheim; David C. Nguyen, Huntington Beach, both of Calif.

[73] Assignee: Circle Seal Controls, Inc., Anaheim, Calif.

[21] Appl. No.: 693,820

[22] Filed: Apr. 30, 1991

[51] Int. Cl.$^5$ .................. G05D 16/06; F16K 31/145
[52] U.S. Cl. .................. 137/495; 137/505.42
[58] Field of Search .......... 137/495, 505.45, 508, 137/505.25, 505.42

[56] References Cited

U.S. PATENT DOCUMENTS

| 168.807 | 10/1975 | Taylor | 137/505.25 |
|---|---|---|---|
| 4,064,899 | 12/1977 | Lehmann | 137/505.25 X |
| 4,181,139 | 1/1980 | Martini | 137/505.25 X |
| 4,655,246 | 4/1987 | Phlipot et al. | 137/505.25 X |

FOREIGN PATENT DOCUMENTS

| 2421726 | 11/1975 | Fed. Rep. of Germany | 137/505.25 |
|---|---|---|---|
| 2910046 | 11/1979 | Fed. Rep. of Germany | 137/505.25 |
| 67882 | 9/1992 | Fed. Rep. of Germany | 137/505.25 |

Primary Examiner—Stephen M. Hepperle
Attorney, Agent, or Firm—Pillsbury Madison & Sutro

[57] ABSTRACT

A regulating shut off valve for a high pressure gas bottle useful when the pressure within the bottle can be higher than the maximum safe working pressure of a pneumatic system connected thereto. The valve is sized to fit under a standard protective cap when installed on a gas bottle. The valve includes a poppet assembly with a needle that acts with a valve seat so that the poppet assembly can be screwed open to allow gas to pass from the bottle to the system or screwed closed against the seat. The valve seat, which is operatively connected to a spring loaded piston to which system pressure is applied, is responsive to the maximum safe working pressure of the system. When such pressure is present, the valve seat moves against the needle to regulate flow.

21 Claims, 4 Drawing Sheets

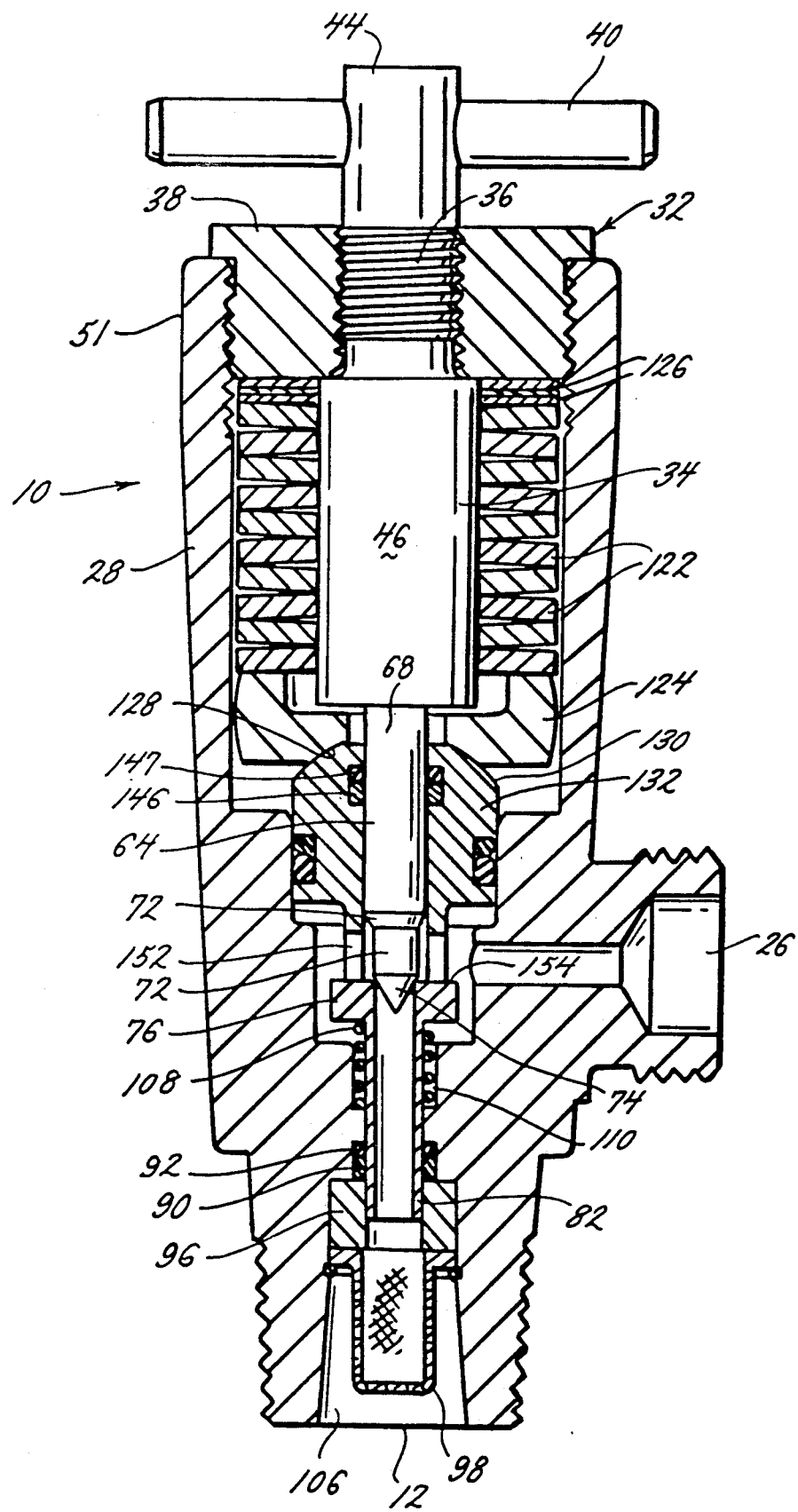

REGULATING SHUT OFF VALVE

DESCRIPTION

1. Technical Field

My invention relates to valves for gas bottles that allow modern storage bottles containing gas at high pressure therein to be used with older, lower pressure systems by preventing more than predetermined pressure to be present at the outlet thereof.

2. Background of the Invention

High pressure gas bottles normally come with a screw type shut off valve installed in the top thereof so that after being charged with gas, the bottle can be sealed and shipped to a customer. Since the bottle is relatively heavy to withstand high gaseous pressure there within, should the bottle get loose, the shut off valve could very easily be knocked off, allowing the gas to violently escape, at which time the bottle can act like a rocket expending gas energy through its mouth and moving dangerously. Therefore it is common practice to provide a robust protective cap to cover shut off valves when bottles, containing gas under pressure, are being moved or shipped. Such caps screw onto the bottle, surrounding and protecting the shut off valve from harm.

Recently higher pressure gas bottles have become available that allow higher volumes of gas to be stored there within. However, many systems and components thereof such as regulators, valves, and other items, exist that were designed for attachment to older, lower pressure supplies. Therefore, if higher pressure bottles are to be universally used, some means must be provided to assure that in no instance can gas be delivered at more than the prior maximum pressure, since such might cause some connected systems to fail, become inoperative, or explode.

Therefore, there is a need to provide a shut off valve for a gas storage bottle that includes regulation means to prevent delivery of gas therefrom above a pre-determined pressure. Such valve must be able to fit underneath a standard protective cap when installed on a gas bottle.

DISCLOSURE OF THE INVENTION

The present regulating shut off valve provides means for automatically regulating the output pressure of a high pressure gas storage bottle to remain below a pre-determined pressure as well as providing manual means to prevent any flow out of the bottle. The valve includes a screw poppet assembly having a needle on an end thereof for selectable sealing engagement with a facing valve seat. The valve seat is forcibly retained in a normal position against an abutment surface in a direction away from the needle by a heavy spring means. A piston, having a pre-determined area, is exposed to system pressure and is also held in place by the heavy spring means. When system pressure begins to reach the predetermined limit, the piston compresses the spring means, allowing the valve seat to move against the needle to reduce the flow therethrough until all flow from the gas supply bottle to which the valve is connected is shut off. In this manner, the system pressure can never exceed a pre-determined safe level. When it is desired to manually close the valve, the poppet assembly is rotated until the needle thereof comes into sealing engagement with the valve seat. The inlet to the valve includes a filter since gas bottles are re-used many times and are notoriously dirty. This prevents dirt from interfering with the proper operation of the needle and valve seat.

Therefore, it is an object of the present invention to provide a regulating shut off valve for high pressure gas bottles that has a small physical envelope.

Another object to provide means for preventing release of gas at greater than a single pre-determined pressure.

Another object to provide a regulating shut off valve that can be constructed relatively economically and whose construction enables high rate production.

Another object is to allow the provision of greater volumes of gas supply to a pre-existing system in a pre-existing storage space by allowing higher pressure gas supply bottles to be connected thereto.

These and other objects and advantages of the present invention will become apparent though skilled in the art after considering the following detailed specifications together with the accompanying drawings wherein.

BRIEF DESCRIPTION OF THE DRAWINGS

FIG. 4 is a cross-sectional view similar to FIGS. 2 and 3, with the valve in its full regulating position, cutting off flow.

BEST MODE FOR CARRYING OUT THE INVENTION

Figure 1:
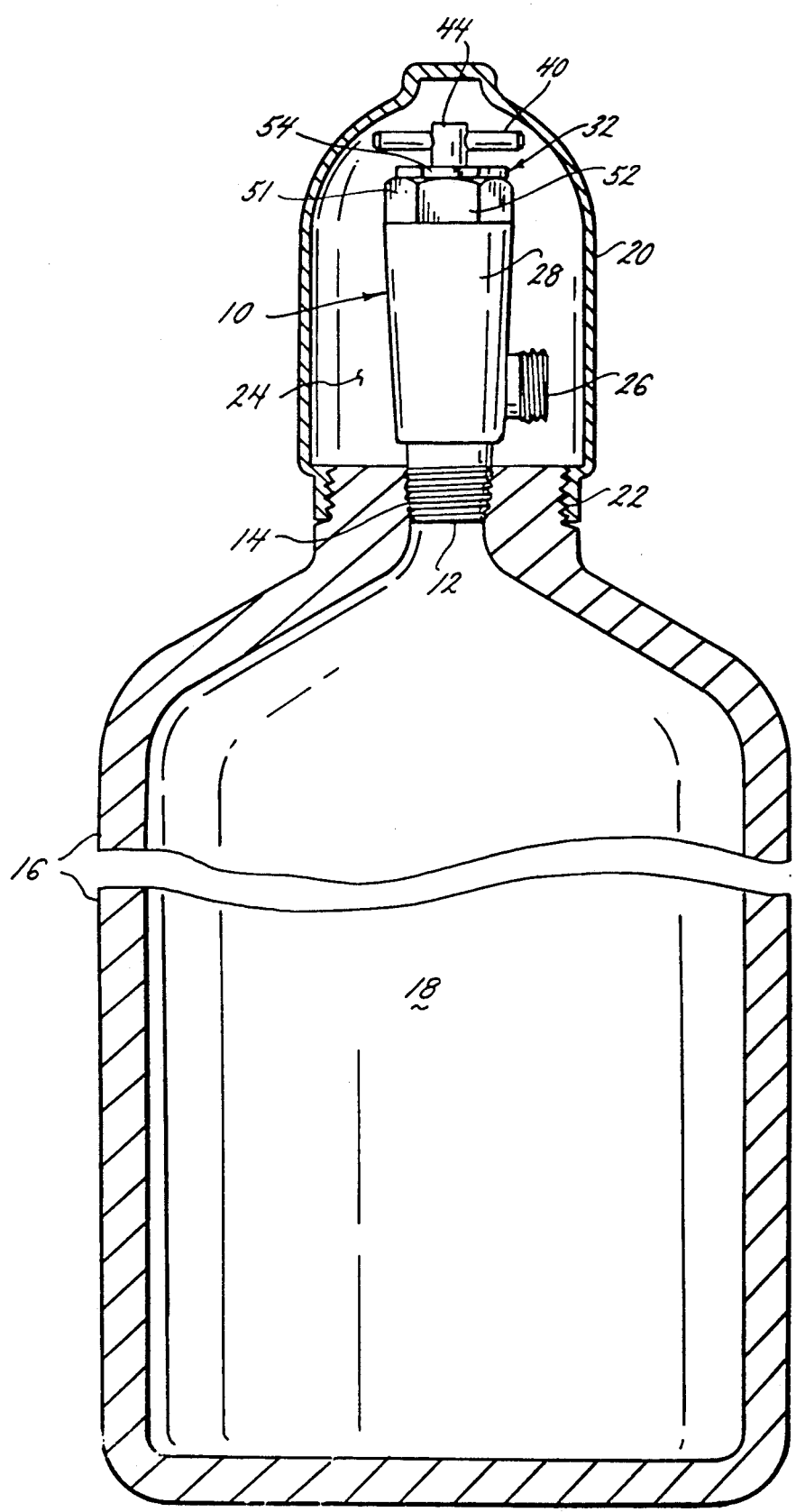
FIG. 1 is an elevational view of the valve of the present invention installed in a gas supply bottle, which is shown in broken cross section.

Referring to the drawings, more particularly by reference numbers, number 10 in FIG. 1 refers to a valve constructed according to the present invention. The valve 10 is shown with its inlet 12 threadably connected in the mouth 14 of a high pressure gas bottle 16 whose interior 18 normally contains high pressure gas. The bottle 16 is shown with its robust protective cap 20 threadably connected to the outer lip 22 of the mouth 14 of the bottle 16. Such robust protective caps 20 are standard items on high pressure gas bottles 16 and are used to protect the shut off valves normally connected thereto. The interior 24 of the cap 20 is relatively small and of standard size so that little room is therewithin for additional mechanism when it is desired to provide regulation as well as means to shut off the flow from the bottle 16 through the outlet 26 of the valve 10.

Figure 2:
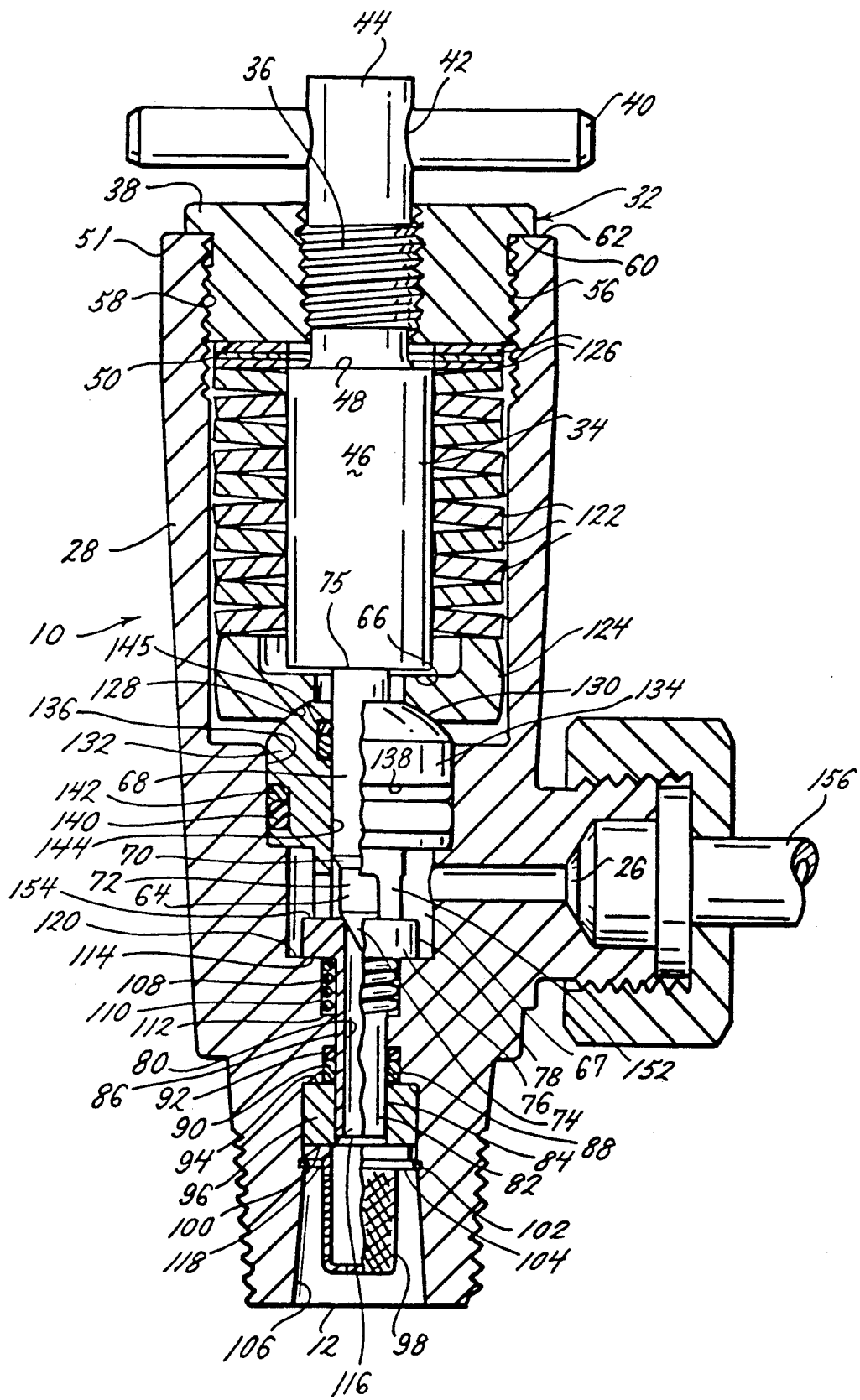
FIG. 2 is a cross-sectional view of the valve of FIG. 1 in its closed condition.

The valve 10 includes a body 28 on which the inlet 12 and the outlet 26 are integrally formed. As shown in FIG. 2, the valve 10 also includes a poppet assembly 32 that includes a stem 34 having a threaded portion 36 that threadably engages a retainer 38. The retainer 38 is assembled with the stem 34 and then a handle 40 is permanently affixed through a hole 42 in the outer end portion 44 of the stem 34. The stem 34 has a barrel portion 46 opposite the threaded portion 36 from the outer end portion 44 that includes an abutment shoulder 48 thereon for engagement with an inner radial surface 50 of the retainer 38. In this manner the stem 34 and the retainer 38 are permanently connected together during assembly so that the stem 34 cannot be unscrewed therefrom.

As shown in FIG. 1, both the body 28 and the outer hexagonal surface 51 of the retainer include wrench flats 52 and 54 respectively for use in assembly. The retainer 38 also includes threads 56 adjacent the hexagonal surface 51 that engage interior threads 58 of the body 28 for threaded engagement there between. The wrench flats 52 and 54 allow the retainer 38 to be tightly threadably connected so that a radial abutment surface 60 thereof comes into firm engagement with a facing shelf 62 of the body 28.

The poppet assembly 32 includes a poppet valve needle 64 positioned opposite from the outer end 44. The needle 64 extends from a inner radial abutment surface 66 of the barrel portion 46 into the regulating chamber 67 formed between the inlet 12 and outlet 26. The needle 64 includes a first cylindrical portion 68 connected by a conical portion 70 to a second cylindrical portion 72 of smaller diameter, which in turn connects to a conical portion 74 that forms one mating surface used to shut off flow through the valve 10. Although the needle 64 may be integral with the barrel portion 46, such imposes concentricity requirements on the machining thereof. Therefore, the poppet assembly 32 preferably is manufactured with the body portions 46 and the needle 64 separate pieces. The back radial surface 75 of the needle 64 is held against the inner abutment surface 66 by the gas pressure at all times the valve 10 is in operation.

The valve 10 is shown in its closed position in FIG. 2 with the needle 64 in engagement with a valve seat 76. The seat 76 has a robust, ring shaped seat portion 78 with a bore 80 formed there through. The seat 76 also includes a long tubular portion 82 whose outer surface 84 slides in an inner bore 86 formed in the body 28. A recess 88 is provided in the bore 86 for receipt of an O-ring 90 and a back up ring 92 to seal the sliding contact between the outer surface 84 of the tubular portion 82 and the inner bore 86 of the body 28. The O-ring 90 and back up ring 92 are held in the recess 88 by the inner radial surface 94 of a bushing 96. A screen type filter 98 is held against an outer radial surface 100 of the bushing 96 by a snap ring 102 positioned in a groove 104 in the tapered inlet bore 106 of the body 28. The snap ring 102 also holds the bushing 96 in the position shown. All gas passing through the inlet 12 must pass through the filter 98 before flowing through the bore 80 of the valve seat 76. This assures that dirt or other debris does not reach the valve seat 76 and cause malfunction of the valve 10.

A relatively light compression spring 108 is positioned in a cylindrical recess 110, trapped between a radial surface 112, where the cylindrical recess 110 relieves the inner bore 86 of the body 28, and an underside radial surface 114 of the seat portion 78 of the valve seat 76. Although the seat 76 is slightly unbalanced to move toward the poppet assembly 32, due to the area of a small radial surface 116 at the outer end 118, the spring 108 assures that the seat 76 will move away from a radial abutment surface 120 on which the outer radial surface 114 of the seat portion 78 normally rests, when not forced thereagainst.

Figure 3:
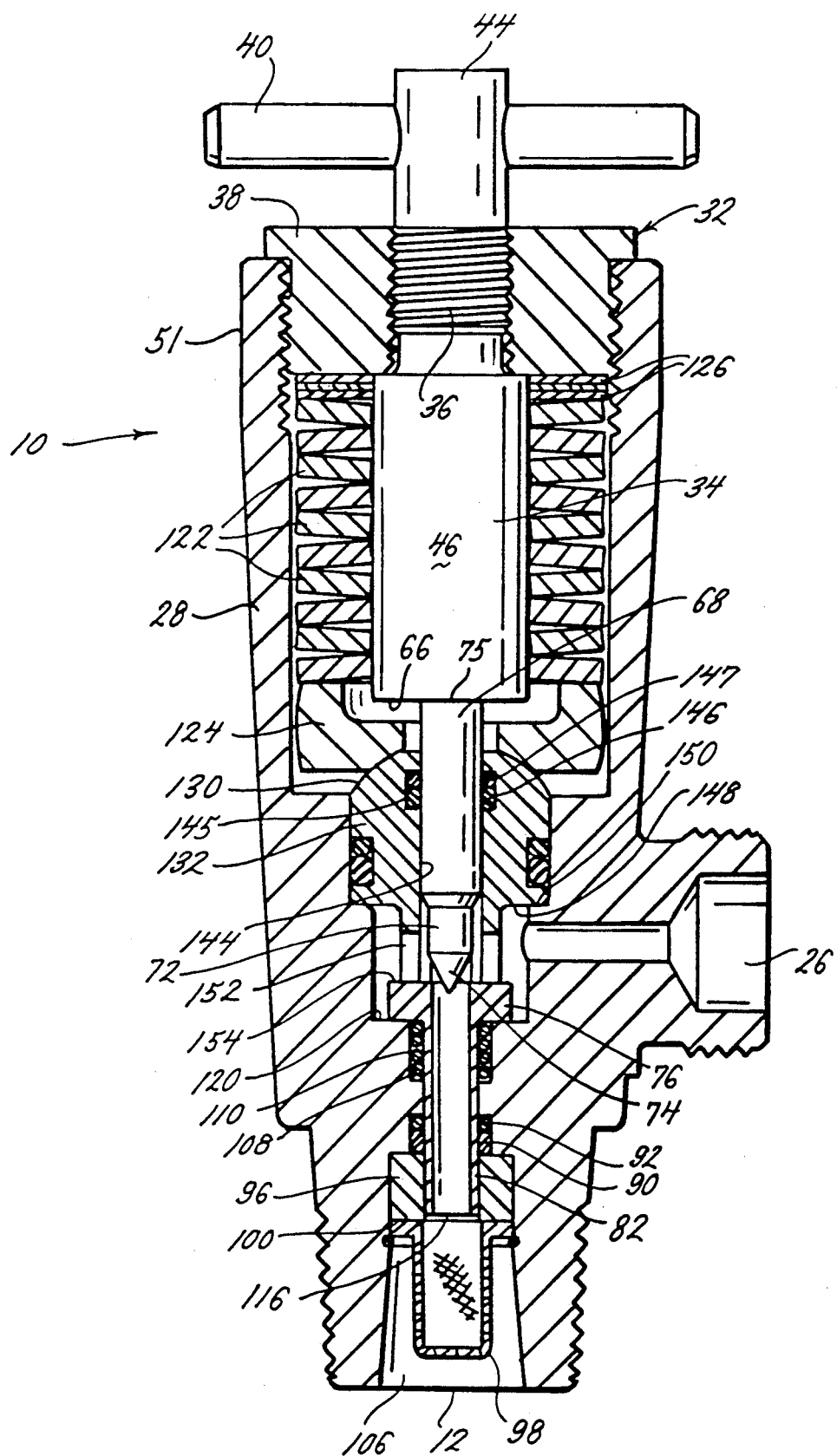
FIG. 3 is a cross-sectional view similar to FIG. 2, with the valve in its full open position.

The seat 76 normally is held adjacent the radial abutment surface 120 by heavy spring means embodied by a plurality of series connected Bellville washers 122. The washers 122 are bounded by the radial surface 50 of the retainer 38 and a spring seat member 124. As shown, shims 126 may be positioned between the washers 122 and the radial surface 50 to adjust the spacing and hence the force created by the washers 122, which in turn adjusts the regulating pressure of the valve 10. The spring seat member 124 has an inner concave surface 128 that bears on a spherical abutment surface 130 of a piston 132. The piston 132 has an outer cylindrical surface 134 that slides in a cylinder 136 formed in the interior of the body 28. The outer cylindrical surface 134 of the piston 132 includes a seal recess 138 for an O-ring 140 and a back up ring 142 there behind. The O-ring 140 prevents leakage of gas between the piston 132 and the cylinder 136. The piston 132 further includes a central cylindrical bore 144 through which the cylindrical portion 68 of the needle 64 can slide. The bore 144 also includes a recess 145 in which are positioned an O-ring 146 and back up ring 147 to prevent leakage of gas between the bore 144 and the cylindrical portion 68 of the needle 64. Normally the piston 132 rests with its inner radial surface 148 held in contact with a radial shelf 150 in the valve body 28 by the force of the washers 122. The piston 132 includes legs 152 that extend to contact an inner radial surface 154 of the seat portion 78. In this manner, when as shown in FIG. 3, the stem 34 is rotated to allow the conical surface 74 of the needle 64 to move away from the seat 76, the seat 76 is held in the position shown, by the force generated by the compressed Bellville washers 122.

However, when the pressure in the outlet 26 of the valve 10 begins to reach a pre-determined limit, as determined by the force created by the Bellville washers 122, the gas pressure acting on the radial surface 148 of the piston 132 overcomes the force of the Bellville washers 122 and moves the piston 132 toward the handle 40. This allows the seat 76 to move toward the needle 64 to regulate gas flow and pressure at the outlet 26 by closure of the passageway there between.

The position of the valve 10 shown in FIG. 4 is that when the maximum safe pressure for the connected pneumatic system 156 is equalled and, therefore, the seat 76 has been allowed by movement of the piston 132 to move to totally close the flow passage within the valve 10 from inlet 12 to outlet 26. When the pressure in the system 156 is reduced, the valve seat 76 moves back to the position shown in FIG. 3. When it is desired to shut off all gas flow through the valve 10, the handle 40 is turned until the stem 34 returns to the position shown in FIG. 2, with the needle 64 in sealing contact with the seat 76 to prevent flow through the valve 10, no matter what the pressures at the inlet 12 and the outlet 26 thereof.

Thus, there has been shown and described a novel pressure regulating shut off valve that fulfills all the objects and advantages sought therefore. Many changes, modifications, variations and other uses and applications of the subject regulating shut off valve will become apparent to those skilled in the art after considering this specification and the accompanying drawings. All such changes, modifications, variations and other uses and applications that do not depart from the spirit and scope of the invention are deemed to be covered by the invention, which is limited only by the claims that follow.

We claim:

1. A valve for a high pressure gas storage bottle that allows filling of the bottle, automatically regulates output pressure to stay below a predetermined limit above ambient pressure when the bottle is providing gas, and provides for manual shut off including:

a valve body having:

an inlet;
an outlet; and
a chamber between said inlet and outlet;
a poppet assembly engaged to said body and extending into said chamber;
valve seat means located in said chamber in position to engage said poppet assembly and restrict flow from said inlet to said outlet through said chamber, said valve seat means including:
  means responsive to pressure at said outlet which allow said valve seat means to move against said poppet assembly when the predetermined pressure limit has been reached and which allow said valve seat means to move away from said poppet assembly when the pressure at said outlet is higher than the pressure at said inlet; and
manual means to move said poppet assembly against said valve seat means to shut off flow from said inlet to said outlet.

2. A regulating shutoff valve for high pressure gas storage bottles including:
a valve body assembly having:
  an inlet;
  an outlet; and
  a chamber between said inlet and outlet;
a poppet assembly engaged to said valve body assembly and extending into said chamber; and
valve seat means located in said chamber in position to engage with said poppet assembly to restrict flow from said inlet to said outlet through said chamber, said valve seat means including:
  a seat member adapted for movement; and
  means responsive to pressure at said outlet which allow said seat member to move against said poppet assembly when a predetermined pressure at said outlet has been reached, said means responsive to pressure including:
  a movable member having:
    a surface exposed to outlet pressure that tends to move said movable member in a first direction; and
    means releasably connecting said movable member to said seat member so that said seat member tends to move with said movable member in the first direction toward said poppet assembly so long as the pressure at said inlet is higher than the pressure at said outlet; and
  spring means urging said movable member in a second opposite direction to resist outlet pressure applied to said movable member surface exposed to outlet pressure.

3. A valve for a high pressure gas storage bottle that automatically regulates output pressure to stay below a predetermined limit above ambient pressure and provides for manual shut off including:
a valve body having:
  an inlet;
  an outlet; and
  a chamber between said inlet and outlet;
a poppet assembly engaged to said body and extending into said chamber;
valve seat means located in said chamber in position to engage said poppet assembly and restrict flow from said inlet to said outlet through said chamber, said valve seat means including:
  means responsive to pressure at said outlet which allow said valve seat means to move against said poppet assembly when the predetermined pressure limit has been reached, said means responsive to pressure including:
  a piston having:
    a surface exposed to outlet pressure that tends to move said piston in a first direction; and
    means operatively connecting said piston to said valve seat means so that said valve seat means tend to move with said piston in the first direction toward said poppet assembly, said means operatively connecting said piston to said valve seat means including:
    at least one arm that extends from said piston to said valve seat means; and
  spring means urging said piston in a second opposite direction to resist outlet pressure applied to said piston surface exposed to outlet pressure; and
manual means to move said poppet assembly against said valve seat means to shut off flow from said inlet to said outlet, said means operatively connecting said piston to said valve seat means further including:
  a valve seat spring capable of producing substantially less force than said spring means, said valve seat spring being positioned to urge said valve seat means toward said at least one arm.

4. A valve for a high pressure gas storage bottle that automatically regulates output pressure to stay below a predetermined limit above ambient pressure and provides for manual shut off including:
a valve body having:
  an inlet;
  an outlet; and
  a chamber between said inlet and outlet;
a poppet assembly engaged to said body and extending into said chamber;
valve seat means located in said chamber in position to engage said poppet assembly and restrict flow from said inlet to said outlet through said chamber, said valve seat means including:
  means responsive to pressure at said outlet which allow said valve seat means to move against said poppet assembly when the predetermined pressure limit has been reached, said means responsive to pressure including:
  a piston having:
    a surface exposed to outlet pressure that tends to move said piston in a first direction; and
    means operatively connecting said piston to said valve seat means so that said valve seat means tend to move with said piston in the first direction toward said poppet assembly; and
  spring means urging said piston in a second opposite direction to resist outlet pressure applied to said piston surface exposed to outlet pressure; and
manual means to move said poppet assembly against said valve seat means to shut off flow from said inlet to said outlet, said poppet assembly including:
a needle having:
  a conical end for engagement with said valve seat means; and
  a cylindrical portion; and
a stem adapted for threadable engagement with said valve body, said manual means being connected to said stem to twist said stem, thereby moving it and said conical end of said needle toward said valve seat means, said stem including:
a stem radial abutment surface, and said needle further including:
a radial abutment surface facing said stem radial abutment surface and being exposed to ambient pressure, whereby when in operation, pressure at said outlet higher than ambient pressure causes said radial abutment surface of said needle to remain in contact with said stem radial abutment surface.

5. A valve for a high pressure gas storage bottle that automatically regulates output pressure to stay below a predetermined limit above ambient pressure and provides for manual shut off including:
a valve body having:
an inlet;
an outlet; and
a chamber between said inlet and outlet;
a poppet assembly engaged to said body and extending into said chamber;
valve seat means located in said chamber in position to engage said poppet assembly and restrict flow from said inlet to said outlet through said chamber, said valve seat means including:
means responsive to pressure at said outlet which allow said valve seat means to move against said poppet assembly when the predetermined pressure limit has been reached, said means responsive to pressure including:
a piston having:
a surface exposed to outlet pressure that tends to move said piston in a first direction; and
means operatively connecting said piston to said valve seat means so that said valve seat means tend to move with said piston in the first direction toward said poppet assembly; and
spring means urging said piston in a second opposite direction to resist outlet pressure applied to said piston surface exposed to outlet pressure; and
manual means to move said poppet assembly against said valve seat means to shut off flow from said inlet to said outlet, said poppet assembly including:
a needle having:
a conical end for engagement with said valve seat means; and
a cylindrical portion; and
a stem adapted for threadable engagement with said valve body, said manual means being connected to said stem to twist said stem, thereby moving it and said conical end of said needle toward said valve seat means, said piston further including:
a cylindrically shaped portion;
a bore therethrough concentric to said cylindrically shaped portion, said cylindrical portion of said needle being positioned within said bore for gas sealed sliding contact therewith, and said valve body further including:
a interior cylindrical surface in which said piston is positioned for gas sealed sliding; and
a radial shelf positioned for contact with said surface of said piston exposed to outlet pressure to restrict sliding movement of said piston in the second direction.

6. A valve for a high pressure gas storage bottle that automatically regulates output pressure to stay below a predetermined limit above ambient pressure and provides for manual shut off including:
a valve body having:
an inlet;
an outlet; and
a chamber between said inlet and outlet;
a poppet assembly engaged to said body and extending into said chamber;
valve seat means located in said chamber in position to engage said poppet assembly and restrict flow from said inlet to said outlet through said chamber, said valve seat means including:
means responsive to pressure at said outlet which allow said valve seat means to move against said poppet assembly when the predetermined pressure limit has been reached, said means responsive to pressure including:
a piston having:
a surface exposed to outlet pressure that tends to move said piston in a first direction; and
means operatively connecting said piston to said valve seat means so that said valve seat means tend to move with said piston in the first direction toward said poppet assembly; and
spring means urging said piston in a second opposite direction to resist outlet pressure applied to said piston surface exposed to outlet pressure; and
manual means to move said poppet assembly against said valve seat means to shut off flow from said inlet to said outlet, said poppet assembly including:
a needle having:
a conical end for engagement with said valve seat means; and
a cylindrical portion; and
a stem adapted for threadable engagement with said valve body, said manual means being connected to said stem to twist said stem, thereby moving it and said conical end of said needle toward said valve seat means, said piston further including:
a cylindrically shaped portion;
a bore therethrough concentric to said cylindrically shaped portion, said cylindrical portion of said needle being positioned within said bore for gas sealed sliding contact therewith; and
a semi-spherical surface on the opposite side thereof from said surface exposed to outlet pressure, said spring means including:
a plurality of Bellville washers positioned in series; and
a disk member having:
a radial surface in contact with one of said Bellville washers to transfer force therebetween; and
a concave spherical surface in contact with said semi-spherical surface of said piston to transfer force thereto from said Bellville washers.

7. A regulating shutoff valve for high pressure gas storage bottles including:
a valve body assembly having:
an inlet;
an outlet; and
a chamber between said inlet and outlet;

a poppet assembly engaged to said valve body assembly and extending into said chamber; and valve seat means located in said chamber in position to engage with said poppet assembly to restrict flow from said inlet to said outlet through said chamber, said valve seat means including:

a seat member; and means responsive to pressure at said outlet which allow said seat member to move against said poppet assembly when a predetermined pressure at said outlet has been reached, said means responsive to pressure including:

a movable member having:

a surface exposed to outlet pressure that tends to move said movable member in a first direction; and means operatively connecting said movable member to said seat member so that seat member tends to move with said movable member in the first direction toward said poppet assembly; and spring means urging said movable member in a second opposite direction to resist outlet pressure applied to said movable member surface exposed to outlet pressure, said means operatively connecting said movable member to said seat member including:

at least one portion that extends from said movable member to said seat member; and a seat spring capable of producing substantially less force than said spring means, said seat spring being positioned to urge said seat member toward said at least one portion.

8. A regulating shutoff valve for high pressure gas storage bottles including:

a valve body assembly having:

an inlet;

an outlet; and a chamber between said inlet and outlet;

a poppet assembly engaged to said valve body assembly and extending into said chamber; and valve seat means located in said chamber in position to engage with said poppet assembly to restrict flow from said inlet to said outlet through said chamber, said valve seat means including:

a seat member; and means responsive to pressure at said outlet which allow said seat member to move against said poppet assembly when a predetermined pressure at said outlet has been reached, said poppet assembly including:

a piston having:

a surface exposed to outlet pressure that tends to move said piston in a first direction; and means operatively connecting said piston to said seat member sot hat said seat member tends to move with said piston in the first direction toward said poppet assembly;

spring means urging said piston in a second opposite direction to resist outlet pressure applied to said piston surface exposed to outlet pressure;

a needle having:

a conical end for engagement with said seat member; and a cylindrical portion;

a stem adapted for threadable engagement with said valve body assembly, said piston further including:

a cylindrically shaped portion; and a bore therethrough concentric to said cylindrically shaped portion, said cylindrical portion of said needle being positioned within said bore for gas sealed sliding contact therewith, said stem including:

a stem radial abutment surface, and said needle further including:

a radial abutment surface facing said stem radial abutment surface and being exposed to ambient pressure, whereby when in operation, pressure at said outlet higher than ambient pressure causes said radial abutment surface of said needle to remain in contact with said stem radial abutment surface.

9. A valve for a high pressure gas storage bottle that automatically regulates output pressure to stay below a predetermined limit above ambient pressure and provides for manual shut off including:

a valve body having:

an inlet;

an outlet; and a chamber between said inlet and outlet;

a poppet assembly engaged to said body and extending into said chamber;

valve seat means located in said chamber in position to engage said poppet assembly and restrict flow from said inlet to said outlet through said chamber, said valve seat means including:

means responsive to pressure at said outlet which allow said valve seat means to move against said poppet assembly when the predetermined pressure limit has been reached; and manual means to move said poppet assembly against said valve seat means to shut off flow from said inlet to said outlet, said means responsive to pressure including:

a piston having:

a surface exposed to outlet pressure that tends to move said piston in a first direction; and means operatively connecting said piston to said valve seat means sot hat said valve seat means tend to move with said piston in the first direction toward said poppet assembly; and spring means urging said piston in a second opposite direction to resist outlet pressure applied to said piston surface exposed to outlet pressure, said poppet assembly including:

a needle having:

a conical end for engagement with said valve seat means; and a cylindrical portion; and a stem adapted for adjustable engagement with said valve body, said manual means being connected to said stem to move said stem, and said conical end of said needle toward said valve seat means, said piston further including:

a cylindrically shaped portion;

a bore therethrough concentric to said cylindrically shaped portion, said cylindrical portion of said needle being positioned within said bore for gas sealed sliding contact therewith.

10. The valve as defined in claim 1 wherein said means responsive to pressure include:

a piston having:

a surface exposed to outlet pressure that tends to move said piston in a first direction; and means releasably operatively connecting said piston to said valve seat means so that said valve seat means tend to move with said piston in the first direction toward said poppet assembly when the pressure at said outlet is lower than the pressure at said inlet and said valve means tend to move away from said piston when the pressure at said outlet is higher than at said inlet; and spring means urging said piston in a second opposite direction to resist outlet pressure applied to said piston surface exposed to outlet pressure.

11. The valve as defined in claim 10 wherein said means releasably operatively connecting said piston to said valve seat means include:

at least one arm that extends from said piston to said valve seat means for releasable abutment therewith.

12. The valve as defined in claim 3 wherein said valve seat spring is compressed between said valve seat means and said valve body.

13. The valve as defined in claim 11 wherein said valve seat means further include:

a surface area exposed to inlet pressure sized so that when said valve seat means is exposed to maximum possible differential pressure between inlet pressure and outlet pressure, said surface area produces force urging said valve seat means to move toward said at least one arm that is substantially less force than the force produced by said spring means.

14. The valve as defined in claim 10 wherein said poppet assembly includes:

a needle having:
a conical end for engagement with said valve seat means; and
a cylindrical portion; and a stem adapted for threadable engagement with said valve body, said manual means being connected to said stem to twist said stem, thereby moving it and said conical end of said needle toward said valve seat means.

15. The valve as defined in claim 9 wherein said valve body further includes:

a interior cylindrical surface in which said piston is positioned for gas sealed sliding; and
a radial shelf positioned for contact with said surface of said piston exposed to outlet pressure to restrict sliding movement of said piston in the second direction.

16. The valve as defined in claim 6 further including:
a filter positioned in said inlet.

17. The valve as defined in claim 2 wherein said means releasably connecting said movable member to said seat member include:

at least one portion that extends from said movable member to said seat member.

18. The valve as defined in claim 7 wherein said seat spring is held in a compressed condition between said seat member and said valve body assembly.

19. The valve as defined in claim 17 wherein said means releasably connecting said movable member to said seat member further include:

a first area exposed to inlet pressure; and
a second area exposed to outlet pressure, said first area being larger than said second area, the difference therebetween being sized so that when said seat member is exposed to maximum possible differential pressure between inlet pressure and outlet pressure, the difference in area between said first and second areas producing substantially less force urging said seat member to move toward said at least one portion than said spring means produces in the opposite direction.

20. The valve as defined in claim 2 wherein said poppet assembly includes:

a needle having:
a conical end for engagement with said seat member; and
a cylindrical portion; and a stem adapted for threadable engagement with said valve body assembly, wherein said movable member further includes:
a cylindrically shaped portion; and
a bore therethrough concentric to said cylindrically shaped portion, said cylindrical portion of said needle being positioned within said bore for gas sealed sliding contact therewith.

21. The valve as defined in claim 8 wherein said piston further includes:

a semi-spherical surface on the opposite side thereof from said surface exposed to outlet pressure, and wherein said spring means include:
a plurality of Bellville washers positioned in series; and
a disk member having:
a radial surface in contact with one of said Bellville washers to transfer force therebetween; and
a concave spherical surface in contact with said semi-spherical surface of said piston to transfer force thereto from said Bellville washers.

* * * * *